D. STRAUSS.
MANUFACTURE OF OXALATES.
APPLICATION FILED APR. 11, 1910.
1,038,985.
Patented Sept. 17, 1912.
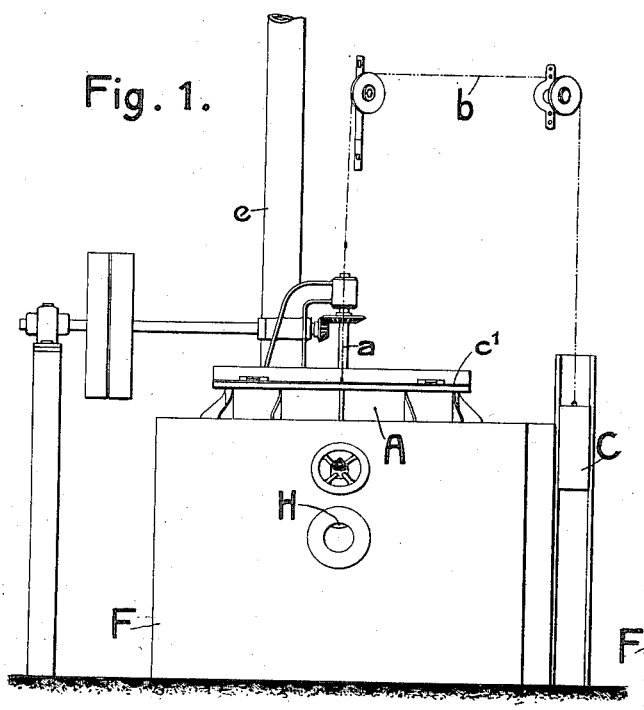
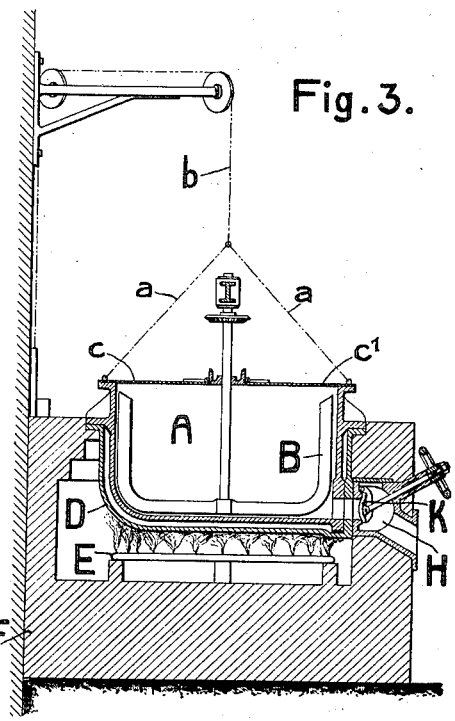
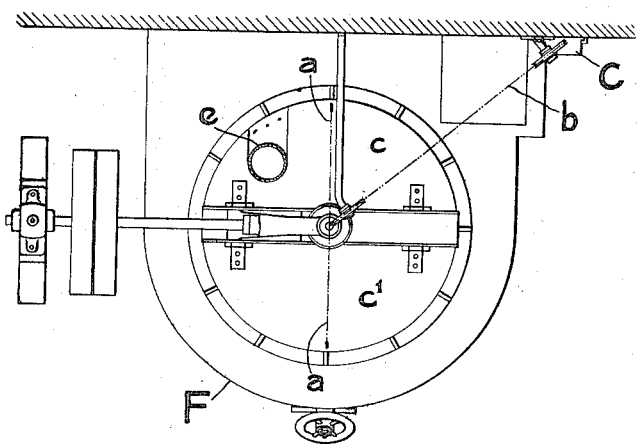

UNITED STATES PATENT OFFICE.

DAVID STRAUSS, OF BASEL, SWITZERLAND, ASSIGNOR TO SOCIETY OF CHEMICAL INDUSTRY IN BASLE, OF BASEL, SWITZERLAND.

MANUFACTURE OF OXALATES.

1,038,985.     Specification of Letters Patent.     Patented Sept. 17, 1912.

Application filed April 11, 1910. Serial No. 554,808.

*To all whom it may concern:*

Be it known that I, DAVID STRAUSS, chemist, a subject of the King of Prussia, and resident of Basel, Switzerland, have invented a new and useful Process for the Manufacture of Oxalates, of which the following is a full, clear, and exact specification.

As Merz and Weith have shown (*Berliner Berichte* 15, pages 1507 and following) alkali formates may be converted into oxalates by action of heat, water being eliminated. Yields worthy of consideration could only be obtained, however, by operating with small quantities of formate and by heating to about 420° C. as quickly as possible in a partial vacuum. Several variations have been proposed in order to overcome the difficulties which present themselves in the technical application of Merz and Weith's reaction. Most of these variations consist in heating a mixture of the formate with another compound, such as an alkali carbonate, an alkali oxalate, or a caustic alkali, either in presence or absence of air.

According to the present invention no other substance need be present, nor need air be excluded, for the formate can be converted in a most simple manner and approximately quantitatively into oxalate, by introducing the formate without any initial admixture and without exclusion of air into a fusion vessel previously heated to a temperature above 400° C., the introduction of the formate and the heating being so controlled that during the reaction the temperature of the vessel is constantly maintained above 400° C.

The annexed drawing shows an example of an apparatus suitable for carrying out this invention.

Figure 1 is a side elevation, Fig. 2 a plan and Fig. 3 a vertical section of the apparatus.

A is an iron heating pan provided with a stirring device B and with two pivoted lids $c$, $c^1$, connected by chains $a$, $a$, $b$, with a weight C having the tendency to hold the lids in their position, when they are opened. The pan A is surrounded by a receptacle D confining an air bath between itself and the pan A and disposed above a series of gas burners E, the said receptacle D and gas burners E being contained in the interior of a masonry mass F provided with the necessary flue for the evacuation of the combustion gases. The pan A is provided with a tube $e$ for the evacuation of the steam and gases resulting from the reaction in the said pan. A socket H provided on the bottom of A and normally closed by a valve K allows to remove from the pan A the oxalate produced, at the end of each operation.

The lids being opened from time to time, the formate is gradually introduced in the iron pan A previously heated to above 400° C., while the stirring device B is in function. A suitable temperature, for example, will be between 500° C. and 570° C. The quantity of formate to be heated in one operation depends on the size of the heating pan. Preferably 150-200 kilos of formate may be heated per square meter of heating surface. The charging of the formate into the pan and the heating of this latter are so controlled that the temperature of the pan can be maintained above 400° C. during the whole operation. The conversion into oxalate occurs very quickly and is finished after 15-30 minutes. The oxalate produced is in the form of a light powder and through the socket H it can be removed straightway from the pan for further treatment, which is not the case when the operation is conducted in a partial vacuum.

It will be apparent that the present invention presents the advantages over the known processes for the manufacture of oxalate, that no initial admixture is necessary and that air need not be excluded. Admixtures give rise to useless material in the product of the reaction; the production of a vacuous chamber causes considerable technical difficulties in working on a large scale, particularly when, as in this case, a gas is liberated by the reaction.

Instead of the heating pan prescribed in the example any other apparatus suitable for the purpose, such as a heated rotating drum with a stirrer, may be used.

What I claim is:

The herein described process for the manufacture of oxalates from formates by introducing alkali formate without any initial admixture and without exclusion of air into a fusion vessel previously heated to a temperature above 400° C., the introduction of the formate and the heating being so controlled that during the reaction the temperature of the vessel is constantly maintained above 400° C.

In witness whereof I have hereunto signed my name this first day of April, 1910, in the presence of two subscribing witnesses.

DAVID STRAUSS.

Witnesses:
  GEO. GIFFORD,
  AMAND RITTER.